(12) United States Patent
Kumar et al.

(10) Patent No.: US 11,551,692 B2
(45) Date of Patent: *Jan. 10, 2023

(54) DIGITAL ASSISTANT

(71) Applicant: FIRST ADVANTAGE CORPORATION, Atlanta, GA (US)

(72) Inventors: Arun N. Kumar, Atlanta, GA (US); Stefano Malnati, La Jolla, CA (US)

(73) Assignee: FIRST ADVANTAGE CORPORATION, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/379,617

(22) Filed: Jul. 19, 2021

(65) Prior Publication Data

US 2022/0115013 A1 Apr. 14, 2022

Related U.S. Application Data (63) Continuation of application No. 16/122,875, filed on Sep. 5, 2018, now Pat. No. 11,074,911.

(Continued)

(51) Int. Cl.
 *G06F 3/16* (2006.01)
 *G06F 9/451* (2018.01)
 (Continued)

(52) U.S. Cl.
 CPC ............... *G10L 15/22* (2013.01); *G06F 3/16* (2013.01); *G06F 3/167* (2013.01); *G06F 9/453* (2018.02);
 (Continued)

(58) Field of Classification Search
 CPC ..... G10L 15/22; G10L 15/18; G10L 15/1815; G10L 15/28; G10L 15/30;
 (Continued)

(56) References Cited

U.S. PATENT DOCUMENTS

| 8,204,751 | B1 * | 6/2012 | Di Fabbrizio | .......... G10L 15/26 704/277 |
| 2014/0244686 | A1 * | 8/2014 | Tran | ........................ G06F 40/40 707/775 |

(Continued)

FOREIGN PATENT DOCUMENTS

EP 2 575 128 A2 4/2013

OTHER PUBLICATIONS

Parag Kulkarni, "Adaptive Learning" in "Reinforcement and Systemic Machine Learning for Decision Making", First Edition, published 2012 by John Wiley & Sons, Inc., pp. 119-149. (Year: 2012).*

(Continued)

*Primary Examiner* — Reza Nabi
*Assistant Examiner* — Hwei-Min Lu
(74) *Attorney, Agent, or Firm* — Oblon, McClelland, Maier & Neustadt, L.L.P.

(57) ABSTRACT

In one aspect, a server that receives, from a client terminal via a network, a request to initiate a verbal conversation using natural language that is in a spoken or textual format, extracts information during the verbal conversation, determines a context of the verbal conversation, receives an inquiry during the verbal conversation, processes the inquiry, acquires response information based on the determined appropriate response, and transmits to the client terminal the response information.

15 Claims, 7 Drawing Sheets

Related U.S. Application Data (60) Provisional application No. 62/554,236, filed on Sep. 5, 2017.

(51) Int. Cl.
| | |
|---|---|
| *G10L 15/22* | (2006.01) |
| *G10L 15/18* | (2013.01) |
| *G10L 15/30* | (2013.01) |
| *H04L 67/306* | (2022.01) |
| *G06F 9/445* | (2018.01) |
| *G06F 40/30* | (2020.01) |
| *H04L 67/01* | (2022.01) |

(52) U.S. Cl.
CPC .......... *G10L 15/1815* (2013.01); *G10L 15/30* (2013.01); *H04L 67/306* (2013.01); *G06F 9/4451* (2013.01); *G06F 40/30* (2020.01); *G10L 2015/227* (2013.01); *G10L 2015/228* (2013.01); *H04L 67/01* (2022.05)

(58) Field of Classification Search
CPC ......... G10L 2015/227; G10L 2015/228; G06F 3/16; G06F 3/167; G06F 9/453; G06F 9/4451; G06F 40/30; G06F 17/2785; H04L 67/42; H04L 67/306
USPC .................................................. 715/705, 708
See application file for complete search history.

(56) References Cited

U.S. PATENT DOCUMENTS

| | | | |
|---|---|---|---|
| 2014/0297284 A1* | 10/2014 | Gruber | G10L 15/183 704/257 |
| 2016/0260029 A1* | 9/2016 | Gelfenbeyn | G06N 5/022 |
| 2016/0351206 A1 | 12/2016 | Gelfenbeyn et al. | |
| 2017/0132019 A1 | 5/2017 | Karashchuk et al. | |
| 2017/0264715 A1* | 9/2017 | Sharma | H04L 67/1001 |
| 2017/0372227 A1* | 12/2017 | Hosabettu | G06N 5/025 |
| 2018/0052842 A1 | 2/2018 | Hewavitharana et al. | |
| 2018/0225365 A1* | 8/2018 | Altaf | G06F 16/3344 |
| 2018/0232436 A1* | 8/2018 | Elson | G06Q 10/10 |
| 2018/0233139 A1* | 8/2018 | Finkelstein | G06V 40/166 |
| 2019/0005021 A1* | 1/2019 | Miller | G06Q 10/06 |

OTHER PUBLICATIONS

Heesik Jeon, et al., "An Intelligent Dialogue Agent for the IoT Home", The Workshops of the Thirtieth AAAI Conference on Artificial Intelligence, Artificial Intelligence Applied to Assistive Technologies and Smart Environments: Technical Report, WS-16-01, Feb. 12-13, 2016, pp. 35-40.

\* cited by examiner

DIGITAL ASSISTANT

CROSS REFERENCE TO RELATED APPLICATION(S)

The present application is a Continuation application of U.S. application Ser. No. 16/122,875, filed Sep. 5, 2018, which is based on and claims the benefit from U.S. Provisional Application No. 62/554,236, filed Sep. 5, 2017, the entire contents of each of which are incorporated hereby by reference.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The present specification relates generally to digital assistants, and more specifically, to a server, method, and computer-readable storage medium implementing a digital assistant.

Recently, voice- or text-based digital assistants have been introduced into the marketplace to handle various tasks such as web searching and navigation. However, often times, these digital assistants do not provide accurate results in an efficient and robust manner.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed subject matter. However, it will be apparent to those skilled in the art that embodiments may be practiced without these specific details. In some instances, well-known structures and components may be shown in block diagram form in order to avoid obscuring the concepts of the disclosed subject matter.

Reference throughout the specification to "one embodiment" or "an embodiment" means that a particular feature, structure, characteristic, operation, or function described in connection with an embodiment is included in at least one embodiment of the disclosed subject matter. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments. Further, it is intended that embodiments of the disclosed subject matter can and do cover modifications and variations of the described embodiments.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

According to embodiments of the disclosed subject matter, an intelligent assistant for screening services can understand the screening domain vocabulary and idioms. As a result, the intelligent assistant can sense the intent of an interacting user and perform, trigger, or enable the screening services with a screening provider. Such assistant may be applied in various fields such as employee screening. Employee screening is an important part of Human Resources. For example, employee screening can include a criminal background check, a credit check, drug tests, and the like. After the employee screening information is collected, the employee screening information still requires verification, routine monitoring, further analysis, and the like.

Referring now to the drawings, wherein like reference numerals designate identical or corresponding parts throughout the several views.

Figure 1:
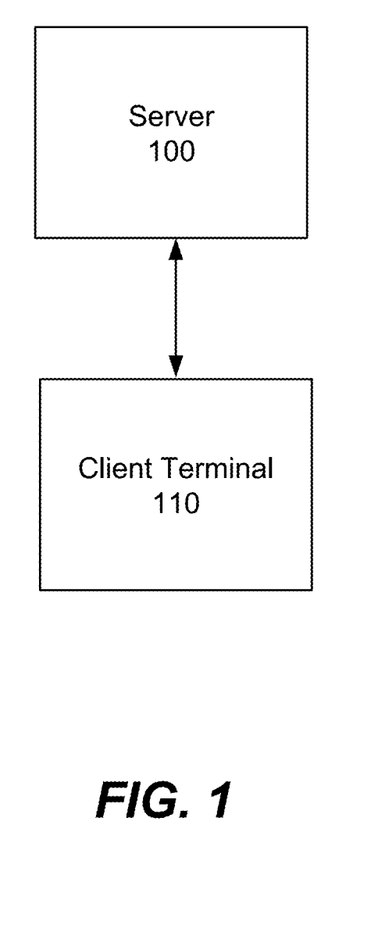
FIG. 1 depicts an exemplary schematic of a server and a client terminal, according to one or more aspects of the disclosed subject matter.

FIG. 1 shows a server 100 and a client terminal (or client device) 110, according to an exemplary aspect of the disclosed invention. Note that more than one client device(s) 110 can be used to communicate with the server 100. It is to be understood that there may be a plurality of each of these aforementioned components. The client terminal 110 may communicate with apparatus 100 via one or more networks (for example, a local area network (LAN) and/or another communications network, such as the Internet).

Server 100 may be a server, computer (personal computer (PC), laptop, netbook, etc.), or the like which may operate with Apple's operating system, Microsoft's Windows®, Google's Android®, Linux, or other operating system software. Server 100 may include the configuration shown in FIG. 2. The server 100 can include processing circuitry.

Figure 2:
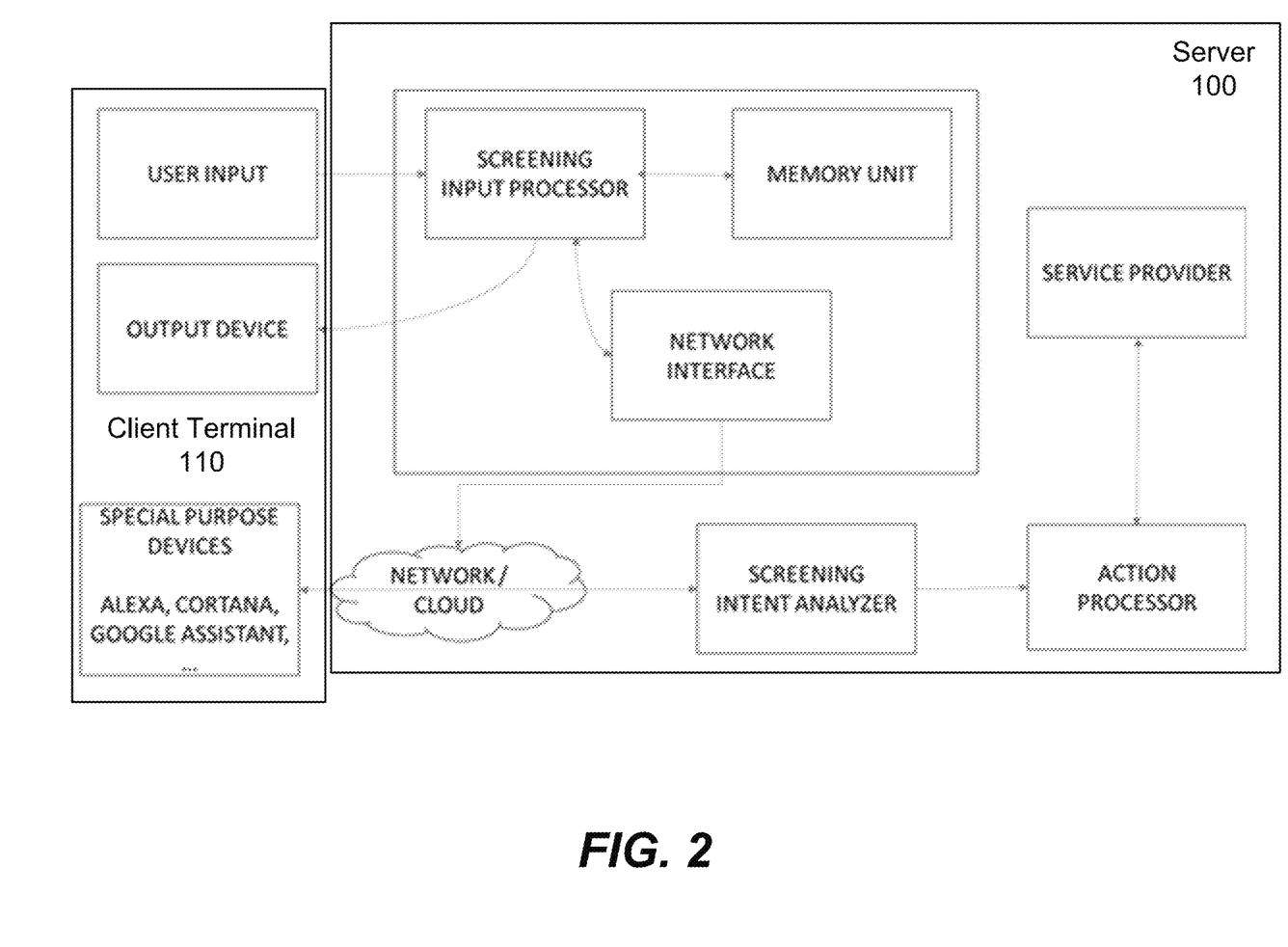
FIG. 2 depicts an exemplary block diagram of a system for screening services according to one or more aspects of the disclosed subject matter.

FIG. 2 depicts an exemplary block diagram of a system 200 for screening services according to one or more aspects of the disclosed subject matter. The server 100 can be configured to host said screening services on said processing circuitry. Screening services can include background screening, as well as screenings for employment, residential, assessments and other information verification and due diligence needs, for example. Additionally, the screening services can include other screenings, information verification, and due diligence needs such as residential, fleet management, and tax credits, for example. The screening services can also be compatible with vendors including court runners, $3^{rd}$ party verification providers, and collection sites. The screening services can also support multi-lingual capabilities and can be applied globally as a result. The multi-lingual support can be based on machine driven language translation services to support a language-of-choice for the users.

The screening services can be a speech, voice, and natural language interface, as well as providing seamless screening services and insights to both customer and industry data.

In one aspect, the server 100 can provide intelligence services for the screening services industry. The screening services industry is an industry under the Human Resources vertical that deals with collecting, verifying, routine monitoring, assessments and analytics from sensitive and personally identifiable information (PII) to publicly accessible information in a secure manner which builds a workplace that's trustworthy, safe, and healthy. An intelligent assistant for screening services can understand the screening domain vocabulary and idioms, as well as sense the intent of an interacting user and perform, trigger, or enable such services with a screening provider as a result.

Types of background services can include criminal background checks, credit checks, drug tests, and the like. Further, background services can include analytical and exploratory services include program management and insights.

Figure 3:
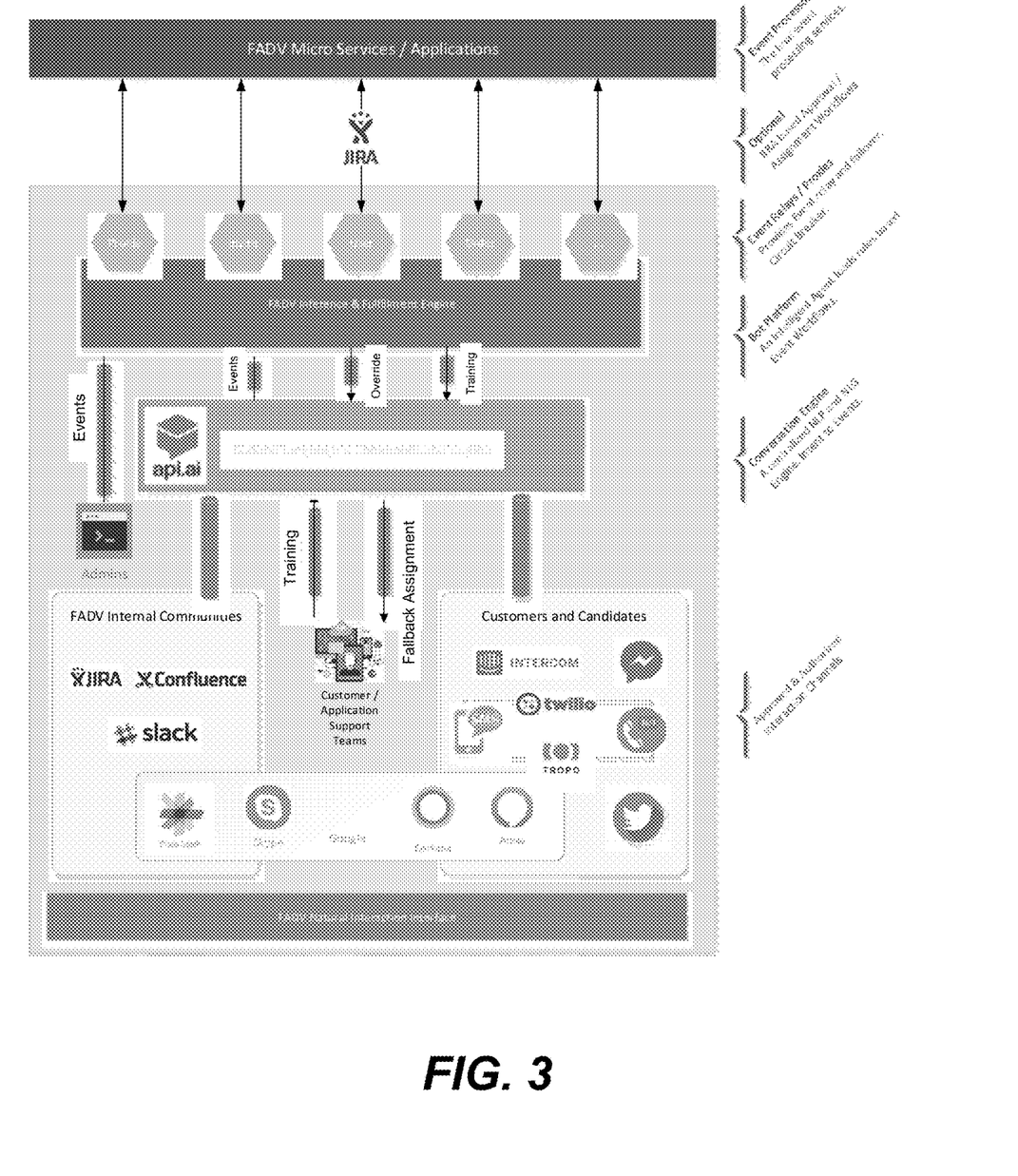
FIG. 3 depicts an exemplary architecture for the screening services system according to one or more aspects of the disclosed subject matter.

FIG. 3 depicts an exemplary architecture for the screening services system according to one or more aspects of the disclosed subject matter.

The screening services architecture can include event processors, JIRA based approval/assignment workflows, event relays/proxies, a bot platform, a conversation engine, and approved and authorized interaction channels.

In one aspect, the server 100 can provide a screening to/for consumers, companies, job applicants, enablers and the like. The user terminal 110 can include a speech interface/dialog to capture spoken voice or typed natural language text, wherein the spoken voice or natural language text can outline the intent of the consumer, for example. The screening services can also collect additional information not available in the spoken intent as suitable to the consumer. The additional information can include required and/or missing additional information from the candidates not already available with either the client or First Advantage. Additionally, the additional information can include documents such as legal consents, authorizations, and other supporting documents, as well as additional information used to support follow-up processes such as consumer disputes on re-screen.

Additionally, the server 100 can derive an intent on what the service is and reach the right service provider such as First Advantage, for example.

Further, the server 100 can provide intuitive and conversational responses to the consumer in voice, audio, graphics, text, hypermedia, and other supported response formats via the user terminal 110.

The server 100 can also build a screening vocabulary and idioms. The screening services could be developed in-house or integrated with external service providers that provide domain agnostic natural language interfaces with extension capabilities (e.g., Google API.AI platform).

The server 100 can be an out of the box system that can integrate with First Advantage Screening APIs, as well as other providers.

Additionally, the server 100 can provide an API for ordering actions like creation of an order, cancellation, disputes, and the like.

Further, the server 100 can provide an API for providing data, both public and PII, in a secure manner over secure communication channels from recruiting companies, as well as a job applicants and employees.

In one aspect, the server 100 can host an automated conversation with a user, for example via the user terminal 110. For example, the server 100 can receive user input from the user terminal 110, wherein the user terminal 110 can host the automated conversation via a messaging application, such as Skype, Facebook Messenger, Whatsapp, WeChat, Line, SMS, etc. In another non-limiting example, user input can be transmitted directly to the server 100. The server 100 can receive data from the user terminal 110 in the form of myriad media, for example in the form of voice, text, tap, or any combination thereof. For example, the received data can include a request for user data. The server 100 can analyze the data and transmit a predetermined response based on the received data, for example transmitting the requested user data.

For example, the server 100 can provide an API for determining candidate background screen status.

In one aspect, the server 100 receives a request from a user, for example a job recruiter, for a predetermined set of data, for example potential job candidates. The server 100 can analyze a plurality of parameters of the request and transmit the predetermined set of data satisfying said plurality of parameters. For example, the server 100 can provide an API for determining candidate qualifications.

In one aspect, the server 100 receives a request from a user, for example a program manager reviewing the screening process, for a predetermined set of data, for example the status of the screening process for a candidate. The server 100 can determine the status of the candidate and transmit the predetermined set of data to the user. For example, the server 100 can transmit that the candidate background check has been completed. For example, the server 100 can transmit that the candidate credit check has not been completed.

In one aspect, the server 100 can determine that a predetermined change to a user profile is needed and transmits the recommendation to a user, for example the candidate, the recruiter, or the program manager. The predetermined change can be determined, for example, based on a user-initiated request, a scheduled audit of said user profile, or any combination thereof.

Figure 4:
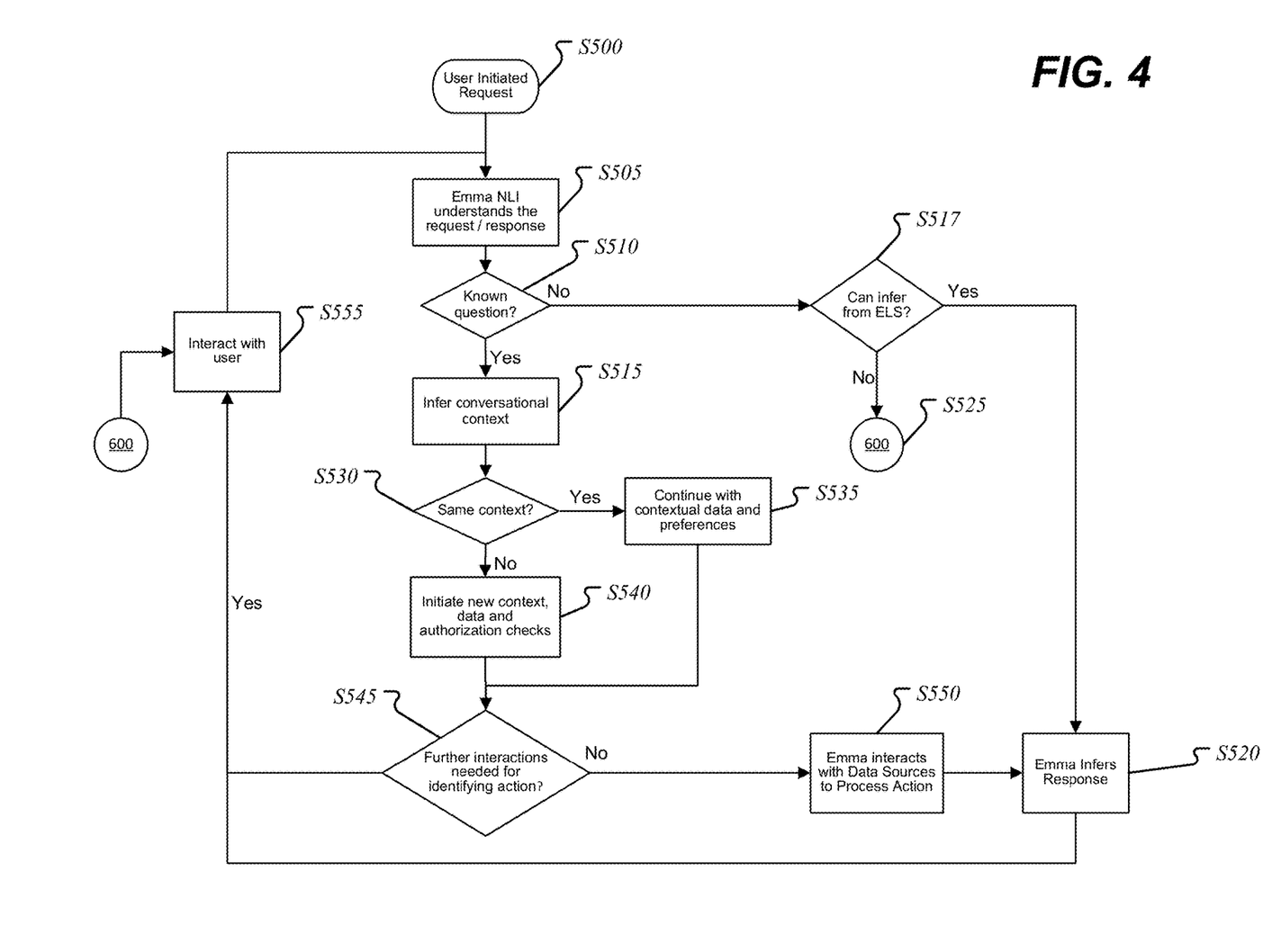
FIG. 4 illustrates a flow chart, according to an exemplary aspect of the disclosed subject matter.

FIG. 4 illustrates a flow chart, according to an exemplary aspect of the present disclosure. In step S500, the request from the user can be initiated by the user via, for example, the user terminal 110. The server 100 can receive the request and initiate a conversation. Requests received by the server 100 can be processed by the server 100 and responses can be transmitted by the server 100 to the user. Based on the accrued information in the conversation, or the amount of context, the accuracy of the responses to the requests can increase.

The request from the user to initiate the conversation can be, for example, a question, a greeting, or a statement requesting data from the server 100. The server 100 can interface with the user through an intelligent assistant, for example named "Emma", via the messaging application. For example, the user can initiate the conversation by typing "Hi, Emma" into the messaging application. In step S505, the server 100 can receive the user initiation and begin a conversation and communicating with the user through Emma.

In one aspect, the initiation of the conversation as received by the server 100 can initialize a transcription or audio recording of the conversation to a memory, beginning with the first request. Subsequent communication, for example statements or questions from the user, can also be transcribed or recorded by the server 100. Transcription or recording can be terminated at the conclusion of the conversation when the server 100 receives an input from the user, for example a farewell phrase such as "Goodbye, Emma" or a phrase of the like.

After the server 100 receives the first request from the user and initializes the conversation, the server 100 can transmit a first response to the user to acknowledge the first request. For example, the server 100 can reply with "Hello". In one aspect, the server 100 can receive predetermined data input from the user before receiving the first request. For example, the server 100 can request the user's name. The server 100 can respond with the user's name (e.g. "Beth") in the server's 100 first response to the first request, for example "Hello, Beth".

The server 100 can transmit a second request for authenticating data from the user. For example, the second request can be "What is your social security number?" The server 100 can receive a second response from the user with the authenticating data. If the authenticating data is correct, the conversation can continue, and the server 100 can receive a third request from the user. In one aspect, the server 100 may detect that the user has already entered correct authentication data into an existing application requiring authentication. This can allow the server 100 to skip the transmission of the request for authentication data from the user.

In one aspect, the server 100 can utilize the received authentication data to access a database storing user information. For example, the database may be a private database including residence information, credit information, motor vehicle registration information, etc.

In one aspect, the server 100 can utilize the information in the database to determine subsequent responses. The server 100 can check the database information and perform an updated of a user profile based on differences between the user profile and the database information. The database information can be provided to the server 100 or accessed through some other entity or service. If the server 100 has control over the service, the server can update the user profile itself or send a request to a remote external device to perform the update. For example, the user profile may be available online via social media and a request to update the user social media profile based on the database information can be transmitted by the server 100 to the social media service. For example, the server 100 may ask the user "Are you still living at 123 Orchard Drive?" and based on a response from the user, the server 100 may update the user's address.

The third request received from the user can be a question regarding the need for the second request. For example, the user can ask "Why do you need my social security number?"

In step S510, the server 100 can determine that the third request is an unknown query and attempt to infer a response based on a base set of defined phrases or utterances, known as an Emma Language System (ELS). If the answer can be inferred (S517), the server 100 can select an answer to the third request and transmit a third response to the user in step S520. If the answer is unable to be inferred from the ELS (S517), the server 100 can initiate a learning process 600 (FIG. 5) in step S525 to update the ELS.

The ELS can be a composite learning system that can self-learn, heal, accept supervised corrections from an external operator, and allow seeding of language elements in order to interface fluidly with external users. The ELS may define new screening entities, idioms, or associations to existing entities. An entity can be a concept that embodies a noun that represents a person, company, policy or other noun forms that has a role in background screening processes. Entities can include properties and behaviors that can be represented in natural languages and lead to a language system/workbench. Entities can be sourced from Knowledge Sources like First Advantage Knowledgebase, Industry standards like HR XML/HR JSON, or really any qualified source, which can allow greater consistency in definition and improved clarity in representation.

Entities can be related to each other and form a relationship or graph. The server's 100 knowledge representation and graph system can form the unambiguous system of checks and relationships permissible. This can guide the server 100 in establishing the correctness or the goal of an utterance from the user.

If the server 100 can determine that the third request is a familiar query (S510), the server can analyze the language of the request, the previously received data from the user, and transmitted data to the user from the server 100, i.e. the context of the conversation in step S515. For example, the context of the conversation can be a job candidate communicating with a potential employer. For example, the context of the conversation can be more specific within the field of job candidates/potential employer, such as a progress of the job application, updating of a resume, submitting of academic transcripts, interview scheduling, position benefits, type of position, position title, etc. For example, a user can submit a request to a telecommunications service provider, i.e. server 100, for an update to a mobile device. For example, the user can desire a new mobile device itself or an update to the software on the mobile device. Without the particular context within which the user is referring to, it is difficult for the service provider to retrieve the most accurate response to the user when an upgrade is requested. Therefore, by taking into account the context of the request during the conversation, the service provider can provide a more accurate response to the user's inquiry. For example, the user may state "I want a new phone". As such, the service provider analyzes the language used throughout the conversation (or the particular environment of the conversation) in order to determine the context i.e. is the user referring to updating the physical device to a new model or updating the operating software on the mobile device.

In one embodiment, the context may not be the actual inquiry or question i.e. update mobile device, but rather the conversation that precedes or follows the inquiry which allows the server 100 to analyze the particular environment that the question is posed in. Therefore the server 100 is able to determine that the inquiry relates to updating of the device itself as opposed to updating something on the mobile device e.g. operating software, applications, etc.

In step S530, if the context is similar to the language included in the third request, the server 100 can continue with the previous contextual data and preferences for determining a response in step S535. For example, the server 100 can transmit a response, such as "Your social security number helps verify your identity." Otherwise, in step S540, the server 100 can determine that the context of the third request is unrelated to the previous conversational context (the previously received data from the user, and transmitted data to the user from the server 100) and the server 100 can initiate new data and authorization checks. For example, the server 100 could receive a request for "What is the weather like today?" and begin analyzing the new data received by the server 100 as a new conversation context.

In one aspect, the server 100 determines that the new conversation context is sufficiently unrelated to the former conversation and deletes the data received by the server 100, analyzed by the server 100, and transmitted by the server 100 during the former conversation. The server 100 can determine that the new conversation context is sufficiently unrelated to the former conversation by applying a weighted value to the idioms and utterances of the former conversation and comparing it to a weighted value applied to the idioms and utterances of the new conversation and determining if a difference in the average weighted values between to the former conversation and new conversation is greater than a predetermined threshold. The predetermined threshold can be determined by a user based on the environment of the conversation of the screening services system 200.

In one aspect, a weighted value can be applied to a new inquiry, wherein the server 100 can determine that the new inquiry is sufficiently related to either the former conversation, the new conversation, or is sufficiently unrelated to both and sets a new threshold for a second new conversation.

Note, inferring context continuations may be a complex process and may require employing several techniques and algorithms, sometimes in parallel to ascertain a given statement is a continuation or related. Non-limiting examples may be:

a. Simple and Strong—Context Phrases/Idioms—Words that are usual continuations. For example, if the user says, "should I be carrying an umbrella?" right after asking "how's the weather?"—since umbrella is a trigger for rain relating to weather.

b. Broad but Weak—Possible responses by domain— Every starting statement either leads to a possible context (or the server 100 may continue querying to get to the context) and each such enrichment stage would have possible responses, which would provide a sub-domain/sub-group of statements possible for a continuation. A search algorithm (heuristic or otherwise) that can probe continuity (like an autocomplete in a search box) would provide a maximum likelihood indicator for the continuity.

c. Weighted distance of deviation of context—If a weighted sum of the utterance deviations from a "current" context has higher distance, then the context is likely broken.

d. A combination of the above or other processes derived by machine learning or Bayesian Inferences.

e. Any natural language technique that may be employed to improvise the accuracy of context identification and switching.

It can be appreciated that other techniques may be used to determine the difference in relevance between the idioms and the utterances of the former conversation, new conversation, and inquiry context.

In step S545, the server 100 can determine that an appropriate response is still unknown and initiate a procedure to interact with the user. For example, if the server receives a request for weather data, the server 100 can transmit a fourth request for clarification of the third (weather) request. For example, the server 100 can transmit "Where is your location?"

In one aspect, the server 100 can retain the former conversation data and continually review the former conversation data when comparing the context of each user request. The server 100 can determine that the context of a user request does not have the same context as a recent conversation and instead has a context more similar to an earlier conversation and begin to analyze the request and determine and transmit an appropriate response based on the context of the earlier conversation. For example, the server 100 can receive a fifth request from the user for further information related to the third request. For example, the fifth request can be "When was the social security authentication implemented?" and the server 100 can analyze the data from the first, second, and third requests (and responses) to determine and transmit an appropriate response to the fifth request. The server 100 can determine that the fourth request is not in the same context and not include the fourth request data in determining an appropriate response.

Advantageously, as the conversation lengthens, or as the amount of data received by the server 100, analyzed by the server 100, and transmitted by the server 100 increases, the increase in contextual information regarding the user requests will increase the accuracy with which the server 100 can determine and transmit an appropriate response.

In one aspect, the server 100 can utilize the information in the database to facilitate task completion with the user. The server 100 can receive an order request to perform a background check for a user. Based on the database information, the server 100 can initially complete/fill-in information necessary to perform a background check. For example, the server 100 can transmit a message to the user requesting confirmation of personal information, such as "Is your birthday Jan. 1, 1980?" and based on a user reply, the server 100 can edit the preliminarily entered information accordingly or move onto the next field of information required.

The server 100 can determine no further interactions are needed for determining an appropriate response and interact with a plurality of data sources to process an action in step S550. For example, the server 100 can receive a request for a background check and the server 100 can determine that all requirements are met by the user, such as sufficient payment, required user identity information has been entered, etc. to process the request.

The server 100 can then infer a response and transmit the response to the user (S520). In step S555, the server 100 can interact with the user to receive additional data or end the conversation.

The following is an exemplary conversation between a user (e.g., Scott) and the intelligent assistant "Emma":

SCOTT: "Hello Emma"

EMMA: "Hey Scott ! Hello Collaborate . . . ! Nice to meet you all"

SCOTT: "Emma, tell the audience about yourself"

EMMA: "I am a natural language interface to FADV's products and will help you and your candidates through the Screening process . . . you just need to ask me a question. Ask Emma will be part of future product releases and will allow both Recruiters and Candidates to use voice in our products"

SCOTT: "That is so cool . . . . Emma, are you related to Siri or Alexa?

EMMA: "Yes, we are sisters . . . that was a joke"

SCOTT: "OK, we'll get into how you work in a minute . . . . Emma, what's up at FADV?"

EMMA: "Well Scott! It was a great year for First Advantage . . . . For starters, we have a new Vision"

SCOTT: "What is the new vision?"

EMMA: "Deliver innovative solutions and insights that help our clients manage risk and hire the best talent"

SCOTT: "Wow, that is powerful. How will FADV make it happen?"

EMMA: "Good question, Scott. It is all part of the new FADV 3.0 strategy focusing on Customer First, Globalization, and Innovation"

SCOTT: "Tell me about 2017 highlights"

EMMA: "Did you know FADV has already added over 150 new customers this year? Should I be pausing for cheers and claps . . . ?"

SCOTT: "That is amazing, what else is new?"

EMMA: "First Advantage is investing in new products and Profile Advantage and Insight Advantage are being launched"

SCOTT: "Tell me about Profile Advantage"

EMMA: "Profile Advantage provides a fantastic Candidate experience. It is a mobile app for Candidates to enroll for Screening services. It is a one-of-a-kind app in the market and will reduce turn-around-times and dramatically improve the interaction and experience with Candidates. You can place an order, send an invite, get status, and so on"

SCOTT: "I love it. Tell me about Insight Advantage"

EMMA: "Insight Advantage provides our customers deeper insights into their programs worldwide all in one powerful dashboard. Let me show you an example"

SCOTT: "Emma, and you are part of these apps?"

EMMA: "Yes, for example, our customer can just speak into their phone to ask the status of a Candidate and I can provide the answer"

SCOTT: "How do our customers learn more?"

EMMA: "Come see our tech team at the booth outside and they can experience it first-hand"

SCOTT: "Thanks, Emma . . . you are awesome!"

EMMA: "Thanks, Scott . . . . I am blushing!"

SCOTT: "Goodbye Emma"

EMMA: "Talk to you later, Scott"

Figure 5:
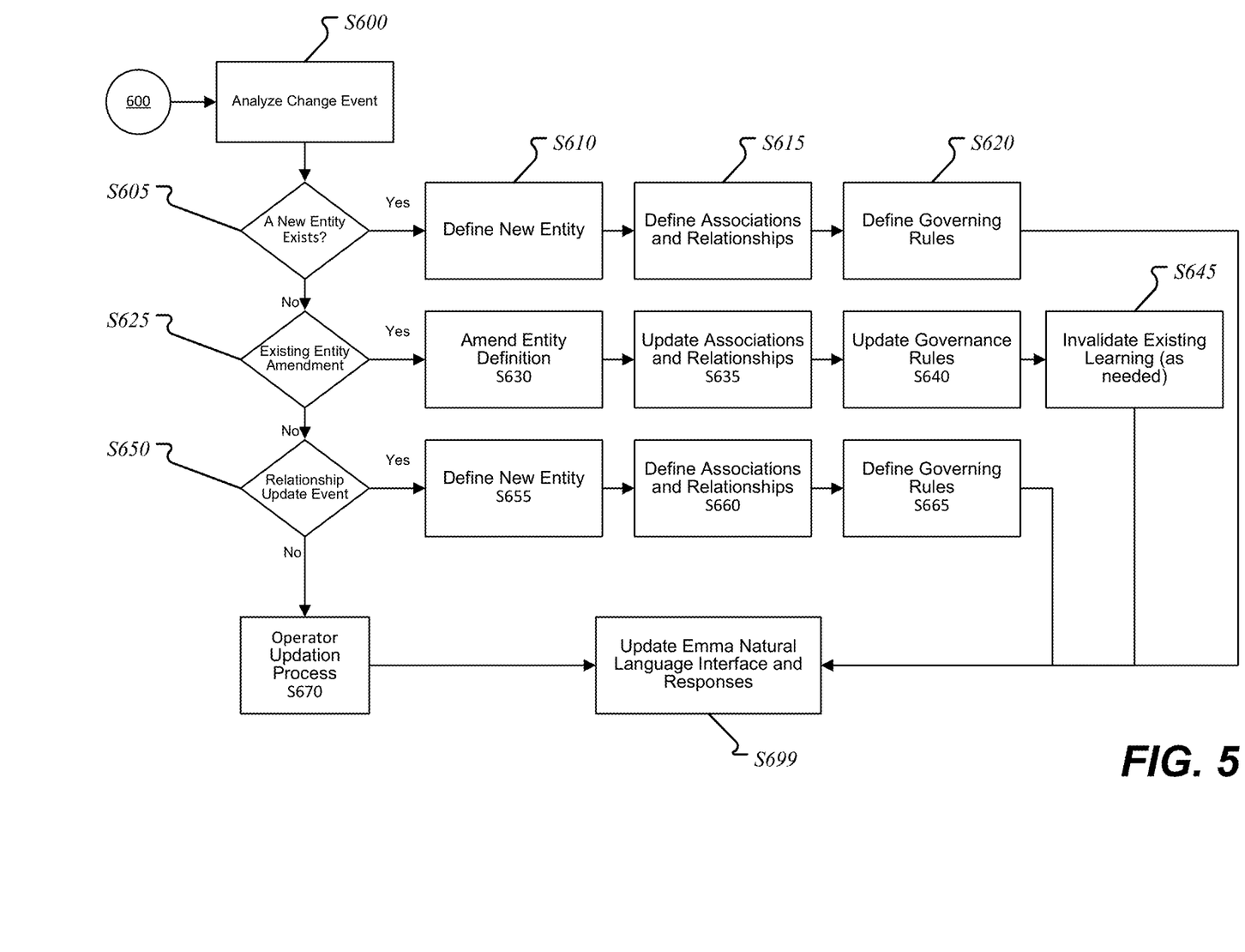
FIG. 5 illustrates a flow chart of the learning method, according to an exemplary aspect of the disclosed subject matter.

FIG. 5 illustrates a flow chart of the learning method 600, according to an exemplary aspect of the present disclosure. The learning process 600 begins with a change event, wherein an unknown condition or event is determined and analysis of the event is desired in order to increase the database of responses for the server 100 to transmit.

The unknown condition or event is analyzed in step S600. If a new entity is detected in step S605, the new entity is defined in step S610, then the associations and relationships related to the new entity are defined in step S615, and then the governing rules for the new entity are defined in step S620 before the database of responses is updated in step S699.

If a new entity is not detected (S625), a determination is made for if an entity amendment exists in step S625. If an entity amendment exists, the entity definition is amended in step S630, then the associations and relationships related to the new entity is updated in step S635, then the governing rules for the new entity are updated in step S640, and existing learning is invalidated in step S645 before the database of responses is updated in step S699.

If a new entity amendment does not exist (S625), a determination is made for if a relationship update related to the entity is needed in step S650. If a relationship update is needed, a new entity is defined in step S655, then the associations and relationships related to the new entity are defined in step S660, and then the governing rules for the new entity are defined in step S665 before the database of responses is updated in step S699.

If a relationship update is not needed, an update can be applied via an external operator in step S670.

Figure 6:
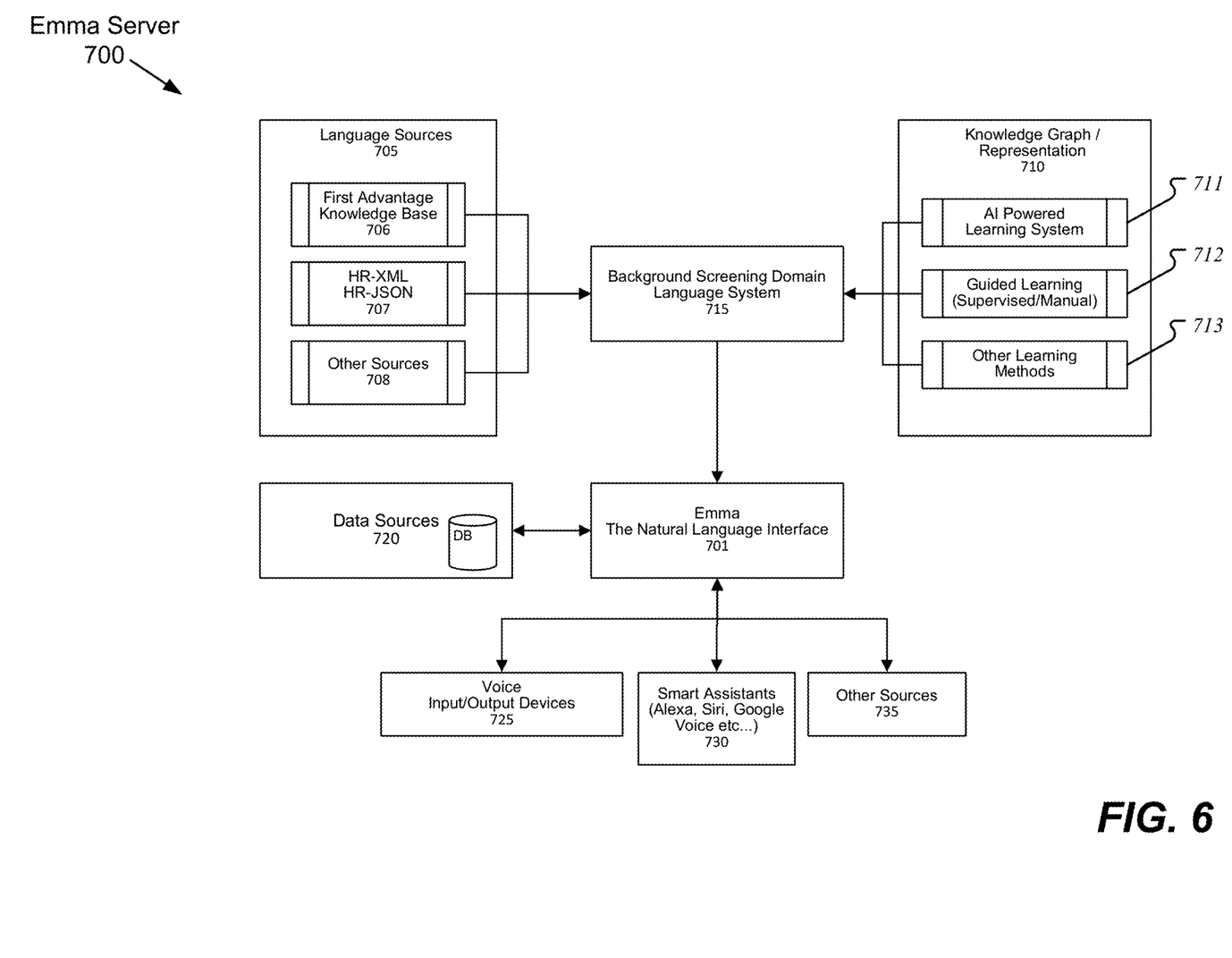
FIG. 6 illustrates a block diagram of an Emma server, according to an exemplary aspect of the disclosed subject matter.

FIG. 6 illustrates a block diagram of an Emma server 700, according to an exemplary aspect of the present disclosure. A language source module 705 includes a knowledge base 706, standards libraries 707, and other library sources 708. A knowledge graph module 710 includes an AI-powered learning module 711, a guided learning module 712, and other learning modules 713. The language source module 705 can communicate with a background screening domain language system 715. The knowledge graph module can also communicate with the background screening domain language system 715. The background screening domain language system 715 can communicate with a natural language interface 701. The natural language interface 701 can communicate with at least one data sources 720, for example an online database. The natural language interface 701 can also communicate with voice input/output devices 725, other intelligent assistants 730 (e.g. Alexa, SIRI, etc.), and other sources 735.

Figure 7:
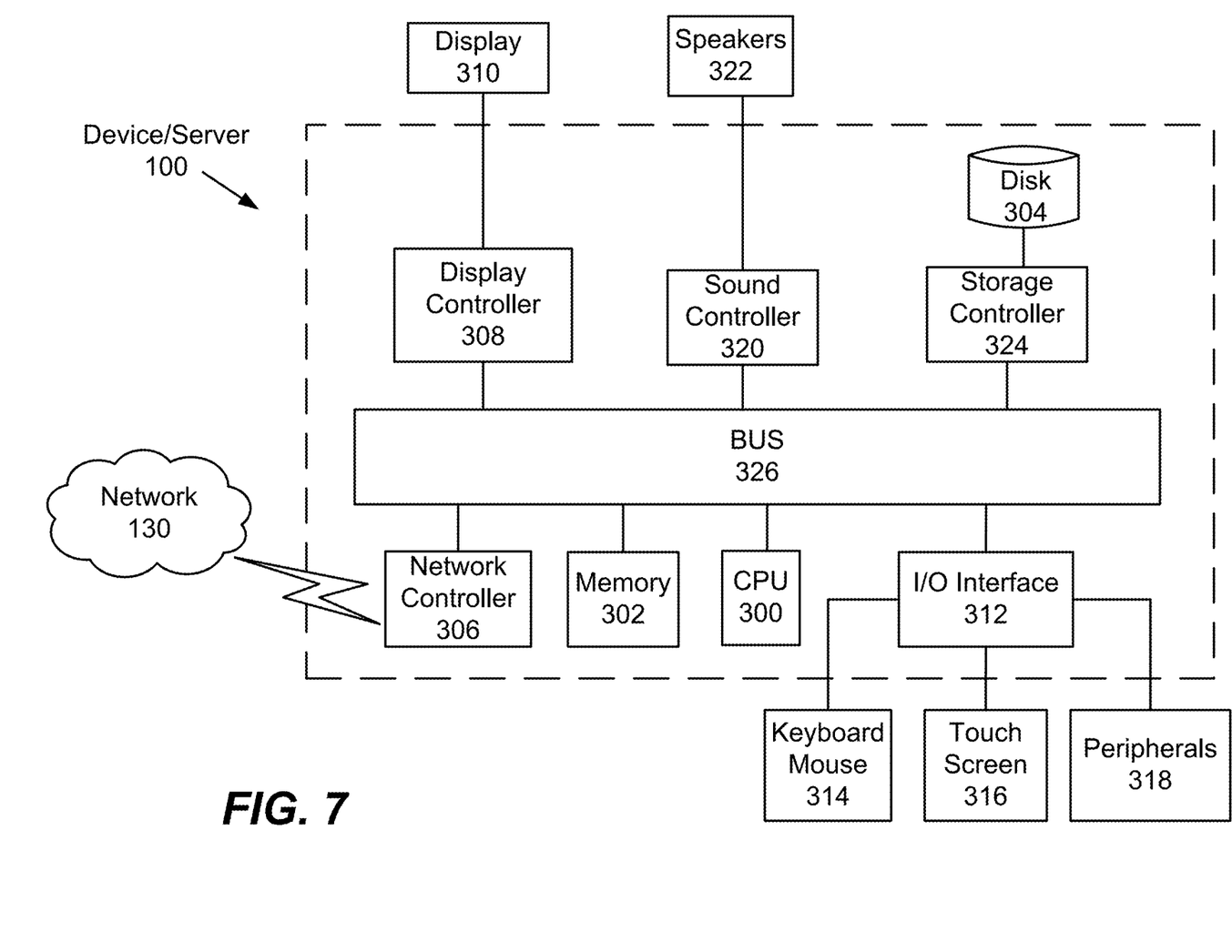
FIG. 7 is a hardware block diagram of a server according to one or more exemplary aspects of the disclosed subject matter.

Next, a hardware description of a computer/device (e.g., server 100) according to exemplary embodiments is described with reference to FIG. 7. The hardware description described herein can be a hardware description of the server 100, client terminal 110, or any other devices discussed herein. In FIG. 7, the server 100 includes a CPU 300 which performs one or more of the processes described above/below. The process data and instructions may be stored in memory 302. These processes and instructions may also be stored on a storage medium disk 304 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the server 100 communicates, such as a server or computer.

Further, the claimed advancements may be provided as a utility application, background daemon, or component of an operating system, or combination thereof, executing in conjunction with CPU 300 and an operating system such as Microsoft Windows, UNIX, Solaris, LINUX, Apple MAC-OS and other systems known to those skilled in the art.

The hardware elements in order to achieve the server 100 may be realized by various circuitry elements. Further, each of the functions of the above described embodiments may be implemented by circuitry, which includes one or more processing circuits. A processing circuit includes a particularly programmed processor, for example, processor (CPU) 300, as shown in FIG. 7. A processing circuit also includes devices such as an application specific integrated circuit (ASIC) and conventional circuit components arranged to perform the recited functions.

In FIG. 7, the server 100 includes a CPU 300 which performs the processes described above. The server 100 may be a general-purpose computer or a particular, special-purpose machine. In one embodiment, the server 100 becomes a particular, special-purpose machine when the processor 300 is programmed to perform mobile keyboard content delivery.

Alternatively, or additionally, the CPU 300 may be implemented on an FPGA, ASIC, PLD or using discrete logic circuits, as one of ordinary skill in the art would recognize. Further, CPU 300 may be implemented as multiple processors cooperatively working in parallel to perform the instructions of the inventive processes described above.

The server 100 in FIG. 7 also includes a network controller 306, such as an Intel Ethernet PRO network interface card from Intel Corporation of America, for interfacing with network 130. As can be appreciated, the network 130 can be a public network, such as the Internet, or a private network such as an LAN or WAN network, or any combination thereof and can also include PSTN or ISDN sub-networks. The network 130 can also be wired, such as an Ethernet network, or can be wireless such as a cellular network including EDGE, 3G and 4G wireless cellular systems. The wireless network can also be WiFi, Bluetooth, or any other wireless form of communication that is known.

The server 100 further includes a display controller 308, such as a graphics card or graphics adaptor for interfacing with display 310, such as a monitor. A general purpose I/O interface 312 interfaces with a keyboard and/or mouse 314 as well as a touch screen panel 316 on or separate from display 310. General purpose I/O interface also connects to a variety of peripherals 318 including printers and scanners.

A sound controller 320 is also provided in the server 100 to interface with speakers/microphone 322 thereby providing sounds and/or music.

The general purpose storage controller 324 connects the storage medium disk 304 with communication bus 326, which may be an ISA, EISA, VESA, PCI, or similar, for interconnecting all of the components of the server 100. A description of the general features and functionality of the display 310, keyboard and/or mouse 314, as well as the display controller 308, storage controller 324, network controller 306, sound controller 320, and general purpose I/O interface 312 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

The functions and features described herein may also be executed by various distributed components of a system. For example, one or more processors may execute these system functions, wherein the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

One embodiment is directed to a server that communicates with a client terminal via a network, the server comprising: processing circuitry configured to receive, from the client terminal via the network, a request to initiate a verbal conversation using natural language that is in a spoken or textual format, extract information during the verbal conversation, the extracted information being associated with credentials of a user, an environment of the verbal conversation, and a request to provide a response, determine a context of the verbal conversation based on the extracted information, receive an inquiry during the verbal conversation, processing the inquiry by analyzing the inquiry in the determined context, and determining an appropriate response to the inquiry, acquire, locally or from an external device, response information based on the determined appropriate response, transmit to the client terminal, via the network, the response information, receive, from the client terminal via the network, a request to end the verbal conversation, transmit to the client terminal, via the network, an acknowledgment that the verbal conversation will end, and terminating the verbal conversation with the client terminal.

One embodiment is directed to a method performed by an apparatus that communicates with a client terminal via a network, the method comprising: receiving, from the client terminal via the network, a request to initiate a verbal conversation using natural language that is in a spoken or textual format; extracting information during the verbal conversation, the extracted information being associated with credentials of a user, an environment of the verbal conversation, and a request to provide a response; determining a context of the verbal conversation based on the extracted information; receiving an inquiry during the verbal conversation; processing the inquiry by analyzing the inquiry in the determined context, and determining an appropriate response to the inquiry; acquiring, locally or from an external device, response information based on the determined appropriate response; transmitting to the client terminal, via the network, the response information; receiving, from the client terminal via the network, a request to end the verbal conversation; transmitting to the client terminal, via the network, an acknowledgment that the verbal conversation will end; and terminating the verbal conversation with the client terminal.

One embodiment is directed to a non-transitory computer-readable storage medium including computer executable instructions, wherein the instructions, when executed by a computer that communicates with a client terminal via a network, causes the computer to perform a method, the method comprising: receiving, from the client terminal via the network, a request to initiate a verbal conversation using natural language that is in a spoken or textual format; extracting information during the verbal conversation, the extracted information being associated with credentials of a user, an environment of the verbal conversation, and a request to provide a response; determining a context of the verbal conversation based on the extracted information; receiving an inquiry during the verbal conversation; processing the inquiry by analyzing the inquiry in the determined context, and determining an appropriate response to the inquiry; acquiring, locally or from an external device, response information based on the determined appropriate response; transmitting to the client terminal, via the network, the response information; receiving, from the client terminal via the network, a request to end the verbal conversation; transmitting to the client terminal, via the network, an acknowledgment that the verbal conversation will end; and terminating the verbal conversation with the client terminal.

The invention claimed is:

1. An apparatus that communicates with a client terminal via a network, the apparatus comprising:
   processing circuitry configured to
      receive, from the client terminal via the network, a request to initiate a session that includes a verbal conversation using natural language that is in a spoken or textual format,
      extract information during the verbal conversation, the extracted information being associated with credentials of a user, an environment of the verbal conversation, and a request to provide a response,
      determine a verbal conversation context of the verbal conversation based on the extracted information,
      assign a verbal conversation context value to the determined verbal conversation context,
      receive an inquiry during the verbal conversation,
      process the inquiry by
         determining an inquiry context of the inquiry,
         assigning an inquiry context value to the determined inquiry context, and
         in response to a difference between the verbal conversation context value and the inquiry context value being less than or equal to a predetermined threshold, determining that the inquiry context of the inquiry is related to the verbal conversation context of the verbal conversation and generating an appropriate response related to the verbal conversation context of the verbal conversation,
      acquire, locally or from an external device, response information based on the generated appropriate response related to the verbal conversation, and
      transmit to the client terminal, via the network, the response information,
   wherein
   the processing circuitry is further configured to generate the appropriate response related to the verbal conversation by determining whether a Language System (LS) includes a set of defined phrases or utterances related to the verbal conversation context of the verbal conversation, and
   upon determining the LS includes the set of defined phrases or utterances related to the verbal conversation context of the verbal conversation, the processing circuitry is further configured to
      amend an existing entity in the LS by updating at least one association and at least one relationship related to the existing entity in the LS,
      update at least one governing rule for the existing entity in the LS, and
      terminate a learning process for the existing entity in the LS.

2. The apparatus according to claim 1, wherein the processing circuitry is further configured to transmit to the client terminal, via the network, an acknowledgment that the session will end.

3. The apparatus according to claim 1, wherein the processing circuitry is further configured to store a text or audio recording of the session to a memory.

4. The apparatus according to claim 3, wherein
   the recording comprises a plurality of portions, and
   the processing circuitry is further configured to separate each of the plurality of portions of the recording based on the verbal conversation context of the verbal conversation.

5. The apparatus according to claim 1, wherein upon determining the LS does not include the set of defined phrases or utterances related to the verbal conversation context of the verbal conversation, the processing circuitry is further configured to
   define a new entity in the LS,
   define at least one association and at least one relationship related to the new entity in the LS, and
   define at least one governing rule for the new entity in the LS.

6. A method performed by an apparatus that communicates with a client terminal via a network, the method comprising:
   receiving, from the client terminal via the network, a request to initiate a session that includes a verbal conversation using natural language that is in a spoken or textual format;
   extracting information during the verbal conversation, the extracted information being associated with credentials of a user, an environment of the verbal conversation, and a request to provide a response;
   determining a verbal conversation context of the verbal conversation based on the extracted information;
   assigning a verbal conversation context value to the determined verbal conversation context;
   receiving an inquiry during the verbal conversation;
   processing the inquiry by
      determining an inquiry context of the inquiry;
      assigning an inquiry context value to the determined inquiry context; and
      in response to a difference between the verbal conversation context value and the inquiry context value being less than or equal to a predetermined threshold, determining that the inquiry context of the inquiry is related to the verbal conversation context of the verbal conversation and generating an appropriate response related to the verbal conversation context of the verbal conversation;
   acquiring, locally or from an external device, response information based on the generated appropriate response related to the verbal conversation; and
   transmitting to the client terminal, via the network, the response information, wherein
   the generating of the appropriate response related to the verbal conversation is performed by determining whether a Language System (LS) includes a set of defined phrases or utterances related to the verbal conversation context of the verbal conversation, and upon determining the LS includes the set of defined phrases or utterances related to the verbal conversation context of the verbal conversation, amending an existing entity in the LS by updating at least one association and at least one relationship related to the existing entity in the LS;

updating at least one governing rule for the existing entity in the LS; and terminating a learning process for the existing entity in the LS.

7. The method according to claim 6, further comprising transmitting to the client terminal, via the network, an acknowledgment that the session will end.

8. The method according to claim 6, further comprising storing a text or audio recording of the session to a memory.

9. The method according to claim 8, wherein the recording comprises a plurality of portions, and the method further comprises separating each of the plurality of portions of the recording based on the verbal conversation context of the verbal conversation.

10. The method according to claim 6, further comprising upon determining the LS does not include the set of defined phrases or utterances related to the verbal conversation context of the verbal conversation, defining a new entity in the LS;

defining at least one association and at least one relationship related to the new entity in the LS; and defining at least one governing rule for the new entity in the LS.

11. A non-transitory computer-readable storage medium including computer executable instructions, wherein the instructions, when executed by a computer that communicates with a client terminal via a network, causes the computer to perform a method, the method comprising:

receiving, from the client terminal via the network, a request to initiate a session that includes a verbal conversation using natural language that is in a spoken or textual format;

extracting information during the verbal conversation, the extracted information being associated with credentials of a user, an environment of the verbal conversation, and a request to provide a response;

determining a verbal conversation context of the verbal conversation based on the extracted information;

assigning a verbal conversation context value to the determined verbal conversation context;

receiving an inquiry during the verbal conversation;

processing the inquiry by determining an inquiry context of the inquiry;

assigning an inquiry context value to the determined inquiry context; and in response to a difference between the verbal conversation context value and the inquiry context value being less than or equal to a predetermined threshold, determining that the inquiry context of the inquiry is related to the verbal conversation context of the verbal conversation and generating an appropriate response related to the verbal conversation context of the verbal conversation;

acquiring, locally or from an external device, response information based on the generated appropriate response related to the verbal conversation; and transmitting to the client terminal, via the network, the response information, wherein the generating of the appropriate response related to the verbal conversation is performed by determining whether a Language System (LS) includes a set of defined phrases or utterances related to the verbal conversation context of the verbal conversation, and upon determining the LS includes the set of defined phrases or utterances related to the verbal conversation context of the verbal conversation, amending an existing entity in the LS by updating at least one association and at least one relationship related to the existing entity in the LS;

updating at least one governing rule for the existing entity in the LS; and terminating a learning process for the existing entity in the LS.

12. The non-transitory computer-readable storage medium according to claim 11, the method further comprising transmitting to the client terminal, via the network, an acknowledgment that the session will end.

13. The non-transitory computer-readable storage medium according to claim 11, the method further comprising storing a text or audio recording of the session to a memory.

14. The non-transitory computer-readable storage medium according to claim 13, wherein the recording comprises a plurality of portions, and the method further comprises separating each of the plurality of portions of the recording based on the verbal conversation context of the verbal conversation.

15. The non-transitory computer-readable storage medium according to claim 11, the method further comprising upon determining the LS does not include the set of defined phrases or utterances related to the verbal conversation context of the verbal conversation, defining a new entity in the LS;

defining at least one association and at least one relationship related to the new entity in the LS; and defining at least one governing rule for the new entity in the LS.

* * * * *